United States Patent
Diehl

(10) Patent No.: US 12,141,245 B2
(45) Date of Patent: Nov. 12, 2024

(54) RE-ENCRYPTION-BASED DIGITAL RIGHTS MANAGEMENT

(71) Applicants: Sony Group Corporation, Tokyo (JP); Sony Pictures Entertainment Inc., Culver City, CA (US)

(72) Inventor: Eric Diehl, Burbank, CA (US)

(73) Assignees: SONY GROUP CORPORATION, Tokyo (JP); SONY PICTURES ENTERTAINMENT, INC., Culver City, CA (US)

( * ) Notice: Subject to any disclaimer, the term of this patent is extended or adjusted under 35 U.S.C. 154(b) by 288 days.

(21) Appl. No.: 17/578,970

(22) Filed: Jan. 19, 2022

(65) Prior Publication Data

US 2023/0229743 A1 Jul. 20, 2023

(51) Int. Cl.
| | | |
|---|---|---|
| *H04L 29/06* | (2006.01) | |
| *G06F 21/10* | (2013.01) | |
| *H04L 9/08* | (2006.01) | |
| *H04L 9/32* | (2006.01) | |

(52) U.S. Cl.
CPC .......... *G06F 21/105* (2013.01); *H04L 9/0869* (2013.01); *H04L 9/0891* (2013.01); *H04L 9/3213* (2013.01); *H04L 9/3268* (2013.01); *G06F 21/107* (2023.08)

(58) Field of Classification Search
CPC ... G06F 21/105; G06F 21/107; H04L 9/0869; H04L 9/0891; H04L 9/3213; H04L 9/3268; H04L 2209/603; H04L 2463/101
See application file for complete search history.

(56) References Cited

U.S. PATENT DOCUMENTS

| | | | | |
|---|---|---|---|---|
| 7,697,693 B1 * | 4/2010 | Elliott | .................... | H04B 10/70 |
| | | | | 380/278 |
| 8,788,304 B2 | 7/2014 | Lee et al. | | |
| 9,213,809 B2 | 12/2015 | Lindquist et al. | | |
| 9,317,513 B1 * | 4/2016 | Bell | ........................ | G06F 16/22 |
| 9,928,350 B2 | 3/2018 | Roelse | | |
| 2002/0120577 A1 * | 8/2002 | Hans | ...................... | G06Q 30/06 |
| | | | | 709/225 |

(Continued)

FOREIGN PATENT DOCUMENTS

| | | | | | |
|---|---|---|---|---|---|
| CN | 1561025 A | * | 1/2005 | | |
| CN | 113285958 A | * | 8/2021 | ......... | H04L 63/0435 |
| KR | 101360354 B1 | * | 2/2014 | | |

(Continued)

OTHER PUBLICATIONS

Hung-Ghang Lee et al:"RBAC-Matrix-Based EMR Right Management System to Improve HIPAA Compliance", Journal of Medical Systems, Kluwer Academic Publishers-Plenum Publishers, NE, vol. 36, No. 5, Sep. 1, 2011(Sep. 1, 2011), pp. 2981-2992, XP035103418, USSA: 1573-689X: DOI:10.1007/S10916-011-9776-0.

*Primary Examiner* — Shawnchoy Rahman
(74) *Attorney, Agent, or Firm* — Procopio, Cory, Hargreaves & Savitch LLP

(57) ABSTRACT

Encrypting a document, including: generating first and second nonces; combining the first and second nonces to generate a secret key that is deterministically defined by the first and second nonces; encrypting the document using the secret key to produce an encrypted document; delivering the first nonce to a license manager; and delivering the second nonce to a rights manager.

20 Claims, 5 Drawing Sheets

(56) References Cited

U.S. PATENT DOCUMENTS

2009/0285391 A1* 11/2009 Johnson ........... H04N 21/43615
380/278
2010/0287610 A1* 11/2010 Joffray ................... G06F 21/34
726/19

FOREIGN PATENT DOCUMENTS

| WO | WO-9935786 A1 | * | 7/1999 | ............. H04N 5/913 |
| WO | WO-2008045880 A2 | * | 4/2008 | ............. G06F 21/10 |

* cited by examiner

RE-ENCRYPTION-BASED DIGITAL RIGHTS MANAGEMENT

BACKGROUND

Field

The present disclosure relates to digital rights management, and more specifically, to re-encryption-based digital rights management.

Background

The traditional security model of Digital Rights Management (DRM) encrypts a document with a secret key. This secret key is usually stored in the secure database of a license manager. The license manager delivers a valid license for the document to a user when a rights manager acknowledges that the user is entitled to access the document. Thus, under this security model, if an attacker gets access to the license manager, the attacker is able to get access to the document regardless of the decision of the rights manager. Accordingly, under this security model, the license manager becomes a single point of failure.

SUMMARY

The present disclosure provides for re-encryption-based digital rights management.

In one implementation, a method for encrypting a document is disclosed. The method includes: generating first and second nonces; combining the first and second nonces to generate a secret key that is deterministically defined by the first and second nonces; encrypting the document using the secret key to produce an encrypted document; delivering the first nonce to a license manager; and delivering the second nonce to a rights manager.

In one implementation, the combination of the first and second nonces is performed as an exclusive-OR (XOR) function. In one implementation, encrypting the document further includes generating a pre-license by encrypting the first nonce for the license manager with a public key of the license manager.

In another implementation, a method for decrypting an encrypted document is disclosed. The method includes: receiving the encrypted document at a user device; sending a request to a rights manager to access the encrypted document; receiving an encrypted second nonce from the rights manager when the rights manager determines to grant the user device access to the encrypted document, wherein the encrypted second nonce is calculated by encrypting a second nonce with a public key of the user device; receiving, at the user device, a token from the rights manager signed with a private key of the rights manager, wherein the rights manager sends the token to a license manager when the rights manager determines to grant the user device access to the encrypted document; receiving, at the user device, a first nonce from a license manager, wherein the license manager sends the first nonce to the user device when the token is received at the license manager from the rights manager; generating a decryption key to decrypt the encrypted document by combining the first nonce with the encrypted second nonce; and decrypting the encrypted document using the decryption key.

In one implementation, the method further includes determining by the license manager whether the token received from the rights manager is valid as defined by a standard. In one implementation, the license manager also receives a pre-license from the rights manager, wherein the pre-license is generated by encrypting the first nonce with a public key of the license manager. In one implementation, the method further includes receiving a license from the license manager when the pre-license and the token are determined to refer to a same document, wherein the license is generated at the license manager by decrypting the pre-license using a private key of the license manager and re-encrypting the decrypted pre-license using the public key of the user device. In one implementation, generating the decryption key by combining the first nonce with the encrypted second nonce includes: decrypting the license with a private key of the user device; decrypting the encrypted second nonce with the private key of the user device; and performing an exclusive OR function of the decrypted license with the decrypted second nonce.

In another implementation, a system for encrypting a document is disclosed. The system includes: a first random number generator to generate and deliver a first nonce to a license manager; a second random generator to generate and deliver a second nonce to a rights manager; a key generator to receive and combine the first and second nonces into a secret key that is deterministically defined by the first and second nonces; and an encryptor to receive and encrypt the document using the secret key to produce an encrypted document, and to generate a document identifier.

In one implementation, the key generator combines the first and second nonces by performing an exclusive-OR (XOR) function on the first and second nonces. In one implementation, the encryptor generates a pre-license by encrypting the first nonce for the license manager with a public key of the license manager. In one implementation, the encryptor sends the pre-license and the document identifier to the rights manager.

In another implementation, a system for decrypting an encrypted document is disclosed. The system includes: a user device including a decryptor and a key generator, the user device to receive the encrypted document and a document identifier, and to send a request to a rights manager to access the encrypted document, wherein the rights manager sends to a license manager an authorization to generate a license for the encrypted document; the key generator to receive an encrypted second nonce from the rights manager, when the rights manager determines to grant the user device access to the encrypted document, wherein the encrypted second nonce is calculated by encrypting a second nonce with a public key of the user device, the key generator to receive a first nonce from the license manager, when the rights manager determines to grant the user device access to the encrypted document, the key generator to generate a decryption key by combining the first and second nonces, and the decryptor to decrypt the encrypted document using the decryption key to produce a decrypted document.

In one implementation, the request sent to the rights manager includes a certificate of the user device to the rights manager. In one implementation, the user device receives a token from the rights manager signed with a private key of the rights manager, wherein the token includes certificate of the user device and the document identifier. In one implementation, the rights manager generates a pre-license by encrypting the first nonce with a public key of the license manager, wherein the user device receives the token, the pre-license, and the encrypted second nonce from the rights manager. In one implementation, the license manager also receives the pre-license from the rights manager. In one implementation, the user device receives a license from the license manager when the pre-license and the token are determined to refer to a same document, wherein the license is generated at the license manager by decrypting the pre-license using a private key of the license manager and re-encrypting the decrypted pre-license using the public key of the user device. In one implementation, the key generator generates the decryption key as a combination of: (a) decrypting the license with a private key of the user device; and (b) decrypting the encrypted second nonce with the private key of the user device. In one implementation, the combination includes an exclusive OR function of the decrypted license with the decrypted second nonce.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As described above, under the current key management model, if an attacker gets access to the license manager, the attacker may be able to get access to the document regardless of the decision of the rights manager. That is, the license manager becomes a single point of failure.

Certain implementations of the present disclosure include splitting the secret key that encrypts the document into a first element and a second element. The first element goes to the license manager, while the second element goes to the rights manager. To decrypt and access the document, the user must obtain both elements of the key. Thus, in this model, an attacker would have to breach both the license manager and the rights manager. After reading below descriptions, it will become apparent how to implement the disclosure in various implementations and applications. Although various implementations of the present disclosure will be described herein, it is understood that these implementations are presented by way of example only, and not limitation. As such, the detailed description of various implementations should not be construed to limit the scope or breadth of the present disclosure.

In one implementation, the secret key that encrypts the document is split into a first element and a second element. As stated above, the first element goes to the license manager, while the second element goes to the rights manager. To decrypt and access the document, the user must first be entitled by the rights manager that securely provides the second element of the key. Once the license manager receives the acknowledgment from the rights manager, the license manager then delivers to the user a secure license that carries the first element of the key. Once an authorized user has both elements of the key, the user can decrypt and access the document. Thus, in this model, an attacker would have to breach both the license manager and the rights manager.

Figure 1:
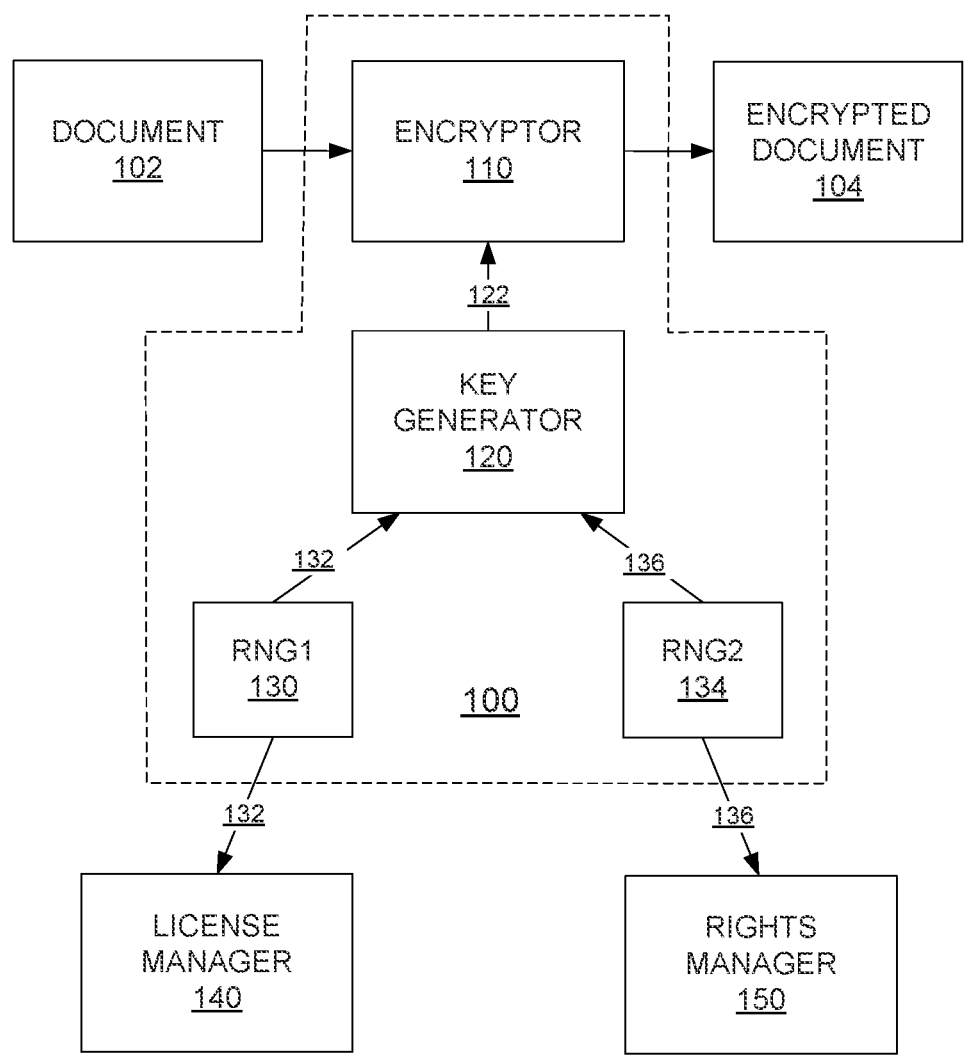
FIG. 1 is a block diagram of an encryption system to protect a document from attackers in accordance with one implementation of the present disclosure.

FIG. 1 is a block diagram of an encryption system 100 for encrypting a document 102 in accordance with one implementation of the present disclosure. In the illustrated implementation of FIG. 1, the encryption system 100 includes an encryptor 110, a key generator 120, a first random number generator 130, and a second random generator 134.

In one implementation, the first random number generator 130 generates a first nonce (CW1) 132 and the second random generator 134 generates a second nonce (CW2) 136. In a particular implementation, the nonces 132, 136 are 128-bit nonces CW1 and CW2, respectively. The two nonces 132, 136 are provided to the key generator 120 which combines the two nonces 132, 136 into one secret key 122 that is deterministically defined by the nonces. In a particular implementation, the key generator 120 is a simple XOR function, which generates CW=CW1$\otimes$CW2.

The following notations are used below: $E_{\{K\}}(m)$ represents the encryption of message m using the key k; and $D_{\{K\}}(m)$ represents the decryption of message m using the key k.

In one implementation, the encryptor 110 encrypts the document (Doc) 102 using the key 122 issued by the user to produce an encrypted document (EDoc) 104. In a particular implementation, the encryptor 110 is Advanced Encryption Standard 128 (AES-128) in Counter (CTR) mode. Thus, in this implementation, the encryptor 110 generates a random 128-bit initialization vector (IV), and the EDoc 104 can be expressed as $EDoc = AES_{\{CW\}}(Doc, IV)$.

In one implementation, the first random number generator 130 securely delivers the first nonce 132 to the license manager 140, while the second random number generator 134 securely delivers the second nonce 136 to the rights manager 150.

In a particular implementation, the encryptor 110 generates a unique document identifier ($ID_D$) for the EDoc 104. The encryptor 110 also generates a pre-license ($PL_D$) by encrypting the first nonce (CW1) for the license manager 140 as follows:

$$PL_D = E_{\{K_{pub\_LM}\}}(CW1),$$

where $K_{pub\_LM}$ = public key of the license manager.

The encryptor 110 then securely sends the pre-license ($PL_D$), the second nonce (CW2), and the document identifier ($ID_D$) to the rights manager 150. The rights manager 150 stores this information, and the second nonce (CW2) is protected in confidentiality in the system.

Figure 2:
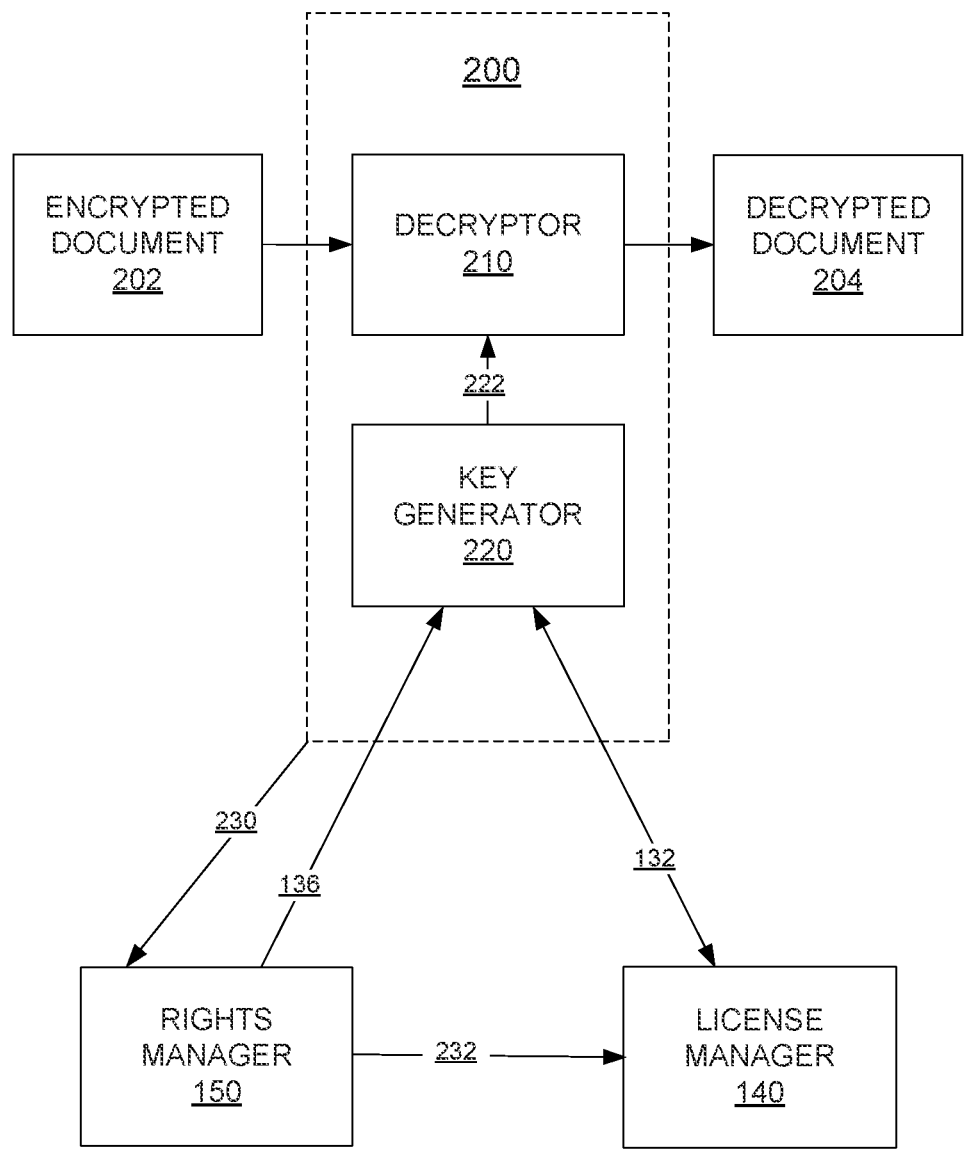
FIG. 2 is a block diagram of a decryption system to decrypt an encrypted document in accordance with one implementation of the present disclosure.

FIG. 2 is a block diagram of a decryption system 200 to decrypt an encrypted document 202 in accordance with one implementation of the present disclosure. In the illustrated implementation of FIG. 2, the decryption system 200 includes a decryptor 210 and a key generator 220. In one implementation, the decryption system is a user device 200 that decrypts the encrypted document 202.

In a first implementation, when the user device 200 receives the encrypted document 202, the user device 200 sends a request 230 to the rights manager 150 to access this document 202. When the rights manager 150 determines to grant access, the rights manager 150 sends the second nonce (CW2) 136 (generated by the second random number generator 134 and securely delivered to the rights manager 150) to the key generator 220 of the user device 200. The rights manager 150 also sends to the license manager 140 an authorization 232 to generate a license for the encrypted document 202.

In the first implementation, when the license manager 140 receives the authorization 232, the license manager 140 sends the first nonce (CW1) 132 to the key generator 220, which combines the first and second nonces 132, 136 and sends the result 222 (i.e., the decryption key) to the decryptor 210. The decryptor 210 then uses the result 222 to decrypt the encrypted document 202 to produce the decrypted document 204.

In a second implementation, when the encrypted document 202 is received by a user device 200, the user device 200 queries the rights manager 150 about the encrypted document 202 by sending a certificate 230 of the user device to the rights manager 150. If the rights manager 150 decides to grant to the user device 200 access to the encrypted document 202, the rights manager 150 initially generates encrypted nonce (CW2') 136 as follows:

$$CW2'=E_{\{K_{pub\_user}\}}(CW2)$$

where
CW2'=encrypted second nonce,
CW2=second nonce,
$K_{pub\_user}$=public key of the user.

In the second implementation, the rights manager 150 then generates a token. In one implementation, the token uses the standard JavaScript Object Notation (JSON) Web Token (JWT) as defined by the Request for Comments 7519 (RFC7519) standard, which is an open standard that defines a self-contained way for securely transmitting information between parties. The token includes the subject field to carry the identifier of the document 202 and a custom field to carry the user's certificate Cert$_{user}$. The rights manager 150 signs the token with its private key $K_{pri\_RM}$, and securely returns the document identifier (ID$_D$), the encrypted nonce (CW2'), the pre-license (PL$_D$), and the token to the user device 200. In one implementation, the user device 200 then securely sends the pre-license (PL$_D$) and the token (232) to the license manager 140. In another implementation, the rights manager 150 securely sends the pre-license (PL$_D$) and the token (232) to the license manager 140.

In the second implementation, the license manager 140 then checks whether the received token is valid, as defined by the RFC7519 standard. If the token is valid, the license manager 140 checks that the token and the pre-license (PL$_D$) match the same document (i.e., check whether the token and the pre-license (PL$_D$) refer to the same document identifier (ID$_D$)). If it is determined that the two items refer to the same document, the license manager 140 extracts the user's public key from the certificate in the token. The license manager 140 generates a license (L$_{D\_user}$) for the user by re-encrypting the pre-license (PL$_D$) for the user as follows:

$$L_{D\_user}=E_{\{K_{pub\_user}\}}(D_{\{K_{pri\_LM}\}}(PL_D))$$

where
$E_{\{K\}}(m)$=encryption of message m using key k,
$D_{\{K\}}(m)$=decryption of message m using key k.

In the second implementation, the license manager 140 sends the generated license (L$_{D\_user}$) 132 to the user device 200, which extracts the decryption key (e.g., CW) 222 by decrypting the license (L$_{D\_user}$) and the encrypted nonce as follows:

$$CW=D_{\{K_{pri\_user}\}}(L_{D\_user}) \otimes D_{\{K_{pri\_user}\}}(CW2'),$$

where
CW=decryption key,
$K_{pri\_user}$=private key of the user,
$D_{\{K\}}(m)$=decryption of message m using key k,
CW2'=encrypted second nonce.

The user device then descrambles the encrypted document (D') to get the decrypted document (D), where D=AES$_{\{CW\}}$(D', IV).

Figure 3A:
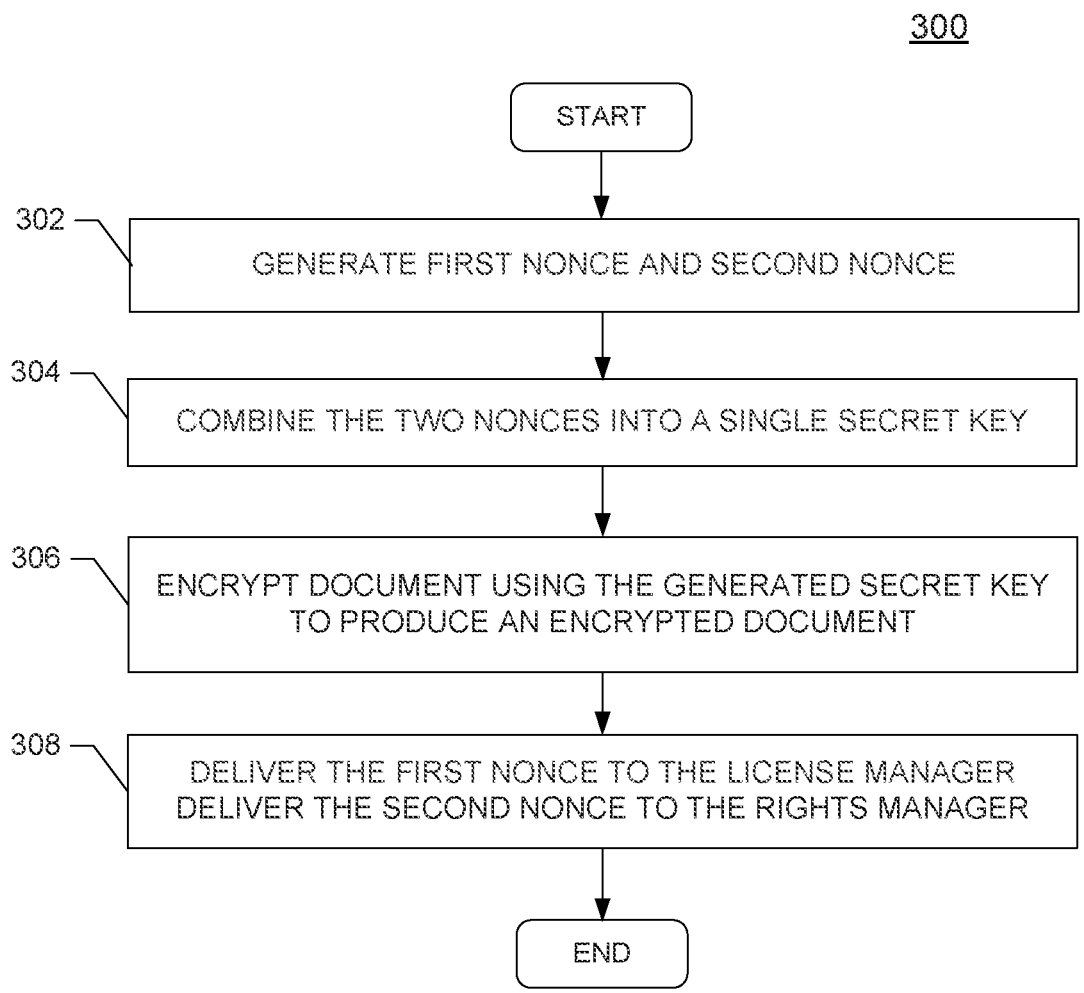
FIG. 3A is a flow diagram of a method for encrypting to protect a document from attackers in accordance with one implementation of the present disclosure.

FIG. 3A is a flow diagram of a method 300 for encrypting a document in accordance with one implementation of the present disclosure. In the illustrated implementation of FIG. 3A, the method 300 includes generating first and second nonces, at block 302. In one example, the nonces 132, 136 are 128-bit nonces CW1 and CW2, respectively. The two nonces are combined, at block 304, into a single secret key that is deterministically defined by the nonces. In one example, the combination of two nonces is performed as a simple XOR function as CW=CW1$\otimes$CW2.

In one implementation, the document is then encrypted, at block 306, using the generated key to produce an encrypted document. In one example of block 306, the encryption step uses Advanced Encryption Standard 128 (AES-128) in Counter (CTR) mode. Thus, in this example, the encryption step generates a random 128-bit initialization vector (IV), and the encrypted document can be expressed as EDoc=AES$_{\{CW\}}$(Doc, IV). Subsequently, the first nonce is securely delivered to the license manager, while the second nonce is securely delivered to the rights manager, at block 308.

In the above-described example of block 306, the encryption step also generates a unique document identifier (ID$_D$) for the encrypted document. The encryption step also generates a pre-license (PL$_D$) by encrypting the first nonce (CW1) for the license manager as follows:

$$PL_D=E_{\{K_{pub\_LM}\}}(CW1),$$

where
$K_{pub\_LM}$=public key of the license manager.

The pre-license (PL$_D$), the second nonce (CW2), and the document identifier (ID$_D$) are securely sent to the rights manager, which stores this information, and the second nonce (CW2) is protected in confidentiality.

Figure 3B:
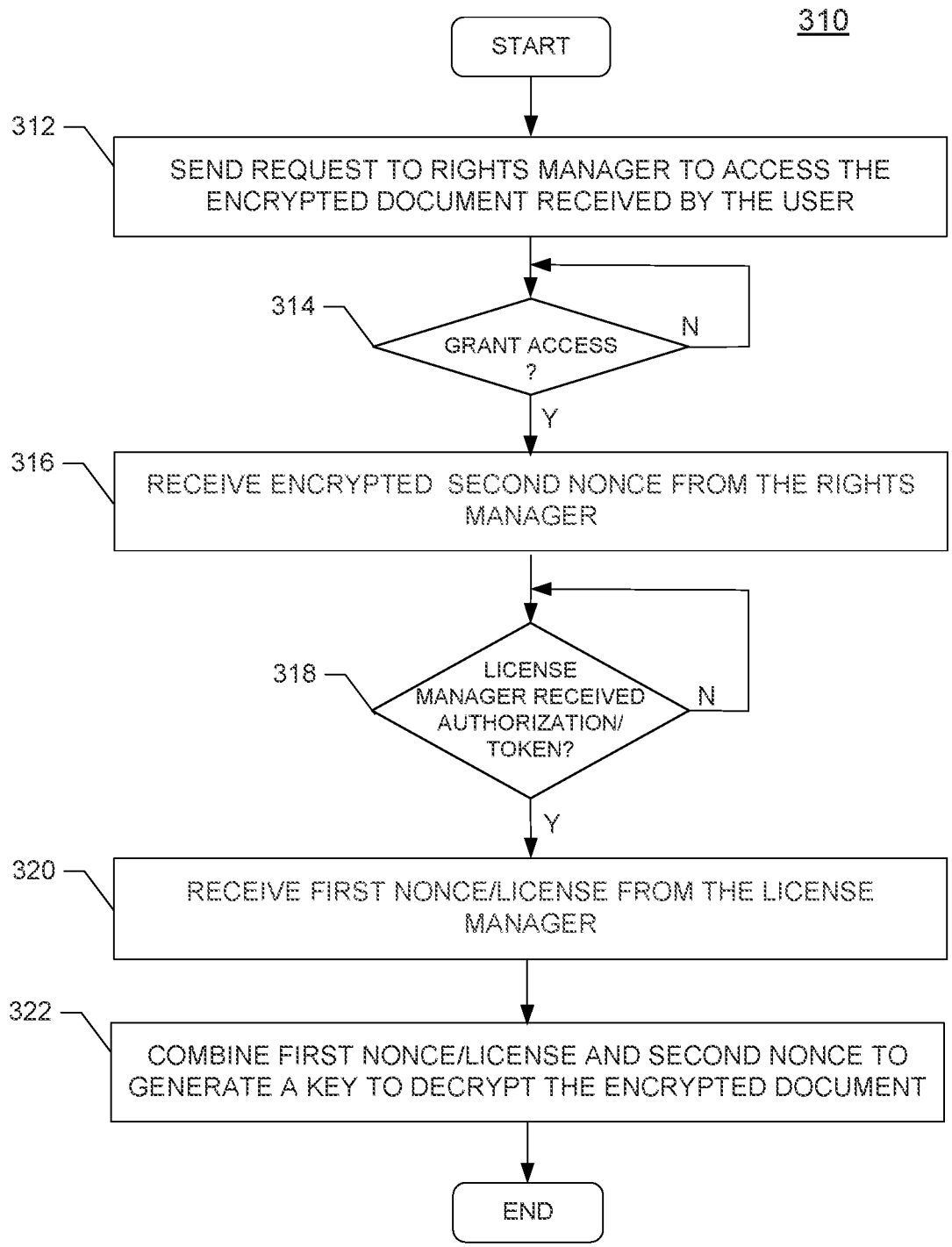
FIG. 3B is a flow diagram of a method to decrypt an encrypted document in accordance with one implementation of the present disclosure.

FIG. 3B is a flow diagram of a method 310 to decrypt an encrypted document in accordance with one implementation of the present disclosure. In the illustrated implementation of FIG. 3B, when the encrypted document is received, a request is sent, at block 312, to the rights manager to access the received document. In one example, the request sent to the rights manager includes a certificate of the user device. When the rights manager determines to grant access, at block 314, an encrypted second nonce is received from the rights manager, at block 316. In one example, the encrypted second nonce is calculated as follows:

$$CW2'=E_{\{K_{pub\_user}\}}(CW2)$$

where
CW2'=encrypted second nonce,
CW2=second nonce,
$K_{pub\_user}$=public key of the user.

When the rights manager determines to grant access to the user (at block 314), the rights manager also generates a token. In one example, the token uses the standard JavaScript Object Notation (JSON) Web Token (JWT) as defined by the RFC7519 standard, and includes the subject field to carry the identifier of the encrypted document and a custom field to carry the user's certificate (Cert$_{user}$). In one implementation, the rights manager signs the token with its private key (K$_{pri\_RM}$), and securely returns the document identifier (ID$_D$), the encrypted nonce (CW2'), the pre-license (PL$_D$), and the token to the user device. In another implementation, the rights manager sends the pre-license (PL$_D$) and the token to the license manager.

In one implementation, when the license manager receives the authorization and/or the PL$_D$/token, at block 318, the license manager sends the first nonce or license, at block 320, to the user device. The first nonce/license and the second nonce are then combined, at block 322, to generate a key to decrypt the encrypted document to produce the decrypted document.

In one example of block 318, the license manager checks whether the received token is valid, as defined by the standard. If the received token is valid, the license manager checks that the token and the pre-license (PL$_D$) match the same document (i.e., the token and the pre-license (PL$_D$) refer to the same document identifier (ID$_D$)). If it is determined that the two items refer to the same document, the license manager extracts the user's public key from the certificate in the token. The license manager then generates a license (L$_{D\_user}$) for the user by re-encrypting the pre-license (PL$_D$) for the user as follows:

$$L_{D\_user}=E_{\{K_{pub\_user}\}}(D_{\{K_{pri\_LM}\}}(PL_D))$$

where
E$_{\{K\}}$(m)=encryption of message m using key k,
D$_{\{K\}}$(m)=decryption of message m using key k.

In one example of block 320, the license manager also sends the generated license (L$_{D\_user}$) to the user. The user extracts the decryption key (e.g., CW) by decrypting the license (L$_{D\_user}$) and the encrypted second nonce as follows:

$$CW=D_{\{K_{pri\_user}\}}(L_{D\_user})\otimes D_{\{K_{pri\_user}\}}(CW2'),$$

where
CW=decryption key,
K$_{pri\_user}$=private key of the user,
D$_{\{K\}}$(m)=decryption of message m using key k,
CW2'=encrypted second nonce.

Subsequently, the user can descramble the encrypted document (D') to get the decrypted document (D), where D=AES$_{\{CW\}}$(D', IV).

Figure 4A:
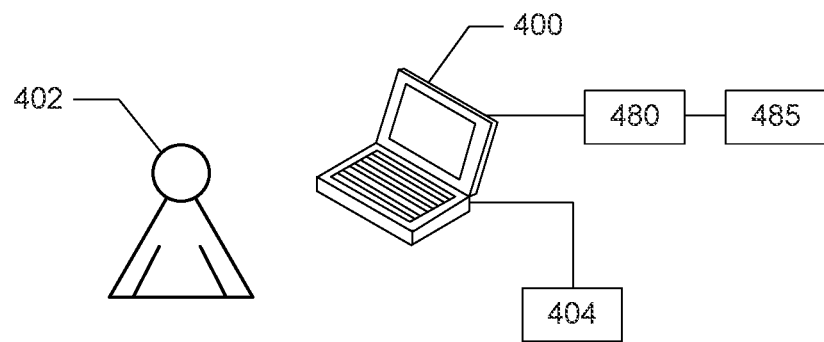
FIG. 4A is a representation of a computer system and a user in accordance with an implementation of the present disclosure.

FIG. 4A is a representation of a computer system 400 and a user 402 in accordance with an implementation of the present disclosure. The user 402 uses the computer system 400 to implement an application 490 for encrypting and decrypting to protect a document from attackers as illustrated and described with respect to the systems 100, 200 in FIGS. 1 and 2 and the methods 300, 310 in FIGS. 3A and 3B.

Figure 4B:
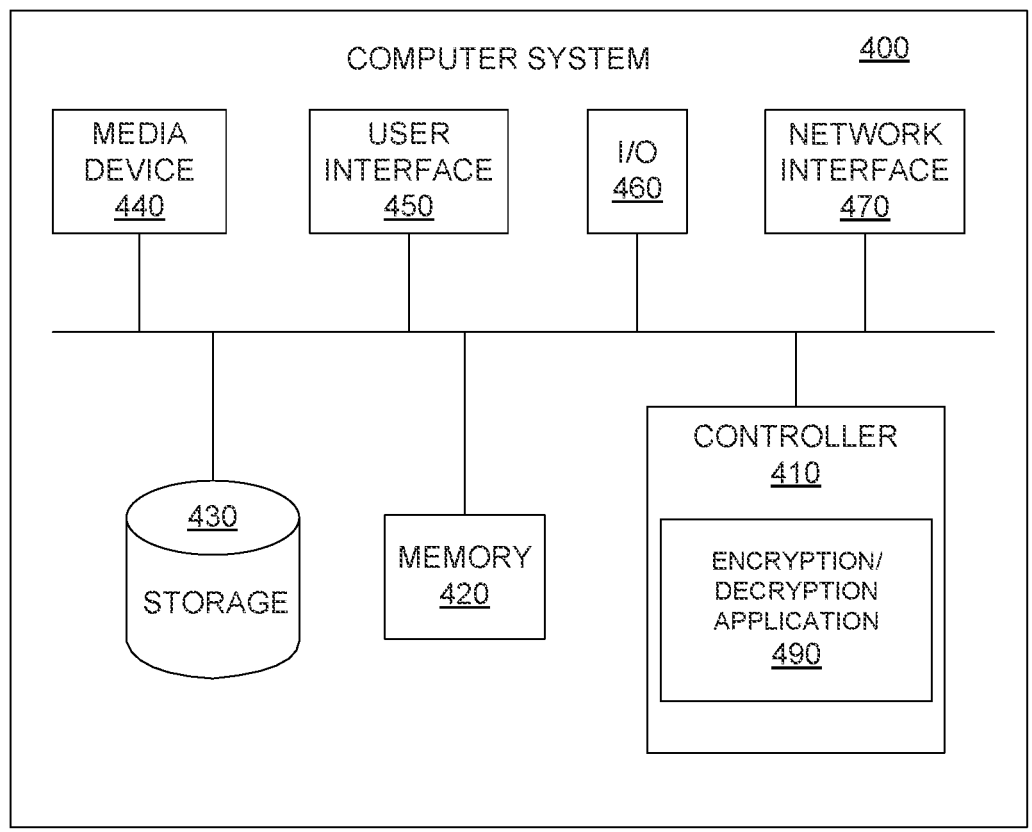
FIG. 4B is a functional block diagram illustrating the computer system hosting the encryption/decryption application in accordance with an implementation of the present disclosure.

The computer system 400 stores and executes the encryption/decryption application 490 of FIG. 4B. In addition, the computer system 400 may be in communication with a software program 404. Software program 404 may include the software code for the encryption/decryption application 490. Software program 404 may be loaded on an external medium such as a CD, DVD, or a storage drive, as will be explained further below.

Furthermore, the computer system 400 may be connected to a network 480. The network 480 can be connected in various different architectures, for example, client-server architecture, a Peer-to-Peer network architecture, or other type of architectures. For example, network 480 can be in communication with a server 485 that coordinates engines and data used within the encryption/decryption application 490. Also, the network can be different types of networks. For example, the network 480 can be the Internet, a Local Area Network or any variations of Local Area Network, a Wide Area Network, a Metropolitan Area Network, an Intranet or Extranet, or a wireless network.

FIG. 4B is a functional block diagram illustrating the computer system 400 hosting the encryption/decryption application 490 in accordance with an implementation of the present disclosure. A controller 410 is a programmable processor and controls the operation of the computer system 400 and its components. The controller 410 loads instructions (e.g., in the form of a computer program) from the memory 420 or an embedded controller memory (not shown) and executes these instructions to control the system, such as to provide the data processing. In its execution, the controller 410 provides the encryption/decryption application 490 with a software system. Alternatively, this service can be implemented as separate hardware components in the controller 410 or the computer system 400.

Memory 420 stores data temporarily for use by the other components of the computer system 400. In one implementation, memory 420 is implemented as RAM. In one implementation, memory 420 also includes long-term or permanent memory, such as flash memory and/or ROM.

Storage 430 stores data either temporarily or for long periods of time for use by the other components of the computer system 400. For example, storage 430 stores data used by the encryption/decryption application 490. In one implementation, storage 430 is a hard disk drive.

The media device 440 receives removable media and reads and/or writes data to the inserted media. In one implementation, for example, the media device 440 is an optical disc drive.

The user interface 450 includes components for accepting user input from the user of the computer system 400 and presenting information to the user 402. In one implementation, the user interface 450 includes a keyboard, a mouse, audio speakers, and a display. The controller 410 uses input from the user 402 to adjust the operation of the computer system 400.

The I/O interface 460 includes one or more I/O ports to connect to corresponding I/O devices, such as external storage or supplemental devices (e.g., a printer or a PDA). In one implementation, the ports of the I/O interface 460 include ports such as: USB ports, PCMCIA ports, serial ports, and/or parallel ports. In another implementation, the I/O interface 460 includes a wireless interface for communication with external devices wirelessly.

The network interface 470 includes a wired and/or wireless network connection, such as an RJ-45 or "Wi-Fi" interface (including, but not limited to 802.11) supporting an Ethernet connection.

The computer system 400 includes additional hardware and software typical of computer systems (e.g., power, cooling, operating system), though these components are not specifically shown in FIG. 4B for simplicity. In other implementations, different configurations of the computer system can be used (e.g., different bus or storage configurations or a multi-processor configuration).

In one implementation, the systems 100, 200 are systems configured entirely with hardware including one or more digital signal processors (DSPs), general purpose microprocessors, application specific integrated circuits (ASICs), field programmable gate/logic arrays (FPGAs), or other equivalent integrated or discrete logic circuitry. In another implementation, the system 300 is configured with a combination of hardware and software.

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. Thus, the present disclosure is not intended to be limited to the implementations shown herein but is to be accorded the widest scope consistent with the principal and novel features disclosed herein.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the present disclosure. In addition, the grouping of functions within a module or step is for ease of description. Specific functions can be moved from one module or step to another without departing from the present disclosure.

All features of the above-discussed examples are not necessarily required in a particular implementation of the present disclosure. Further, it is to be understood that the description and drawings presented herein are representative of the subject matter that is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method for encrypting a document, the method comprising:
   generating and delivering a first nonce to a license manager;
   generating and delivering a second nonce to a rights manager;
   combining the first nonce received at the license manager and the second nonce received at the rights manager to generate a secret key that is deterministically defined by the first and second nonces;
   delivering the generated secret key;
   receiving and encrypting the document using the secret key to produce an encrypted document and a document identifier; and
   delivering the document identifier to the rights manager.

2. The method of claim 1, wherein the combination of the first and second nonces is performed as an exclusive-OR (XOR) function.

3. The method of claim 1, wherein encrypting the document further comprises
   generating a pre-license by encrypting the first nonce for the license manager with a public key of the license manager.

4. A method for decrypting an encrypted document, the method comprising:
   receiving the encrypted document at a user device;
   sending a request to a rights manager to access the encrypted document;
   receiving an encrypted second nonce from the rights manager when the rights manager determines to grant the user device access to the encrypted document,
   wherein the encrypted second nonce is calculated by encrypting a second nonce with a public key of the user device;
   receiving, at the user device, a token from the rights manager signed with a private key of the rights manager,
   wherein the rights manager sends the token to a license manager when the rights manager determines to grant the user device access to the encrypted document;
   receiving, at the user device, a first nonce from a license manager,
   wherein the license manager sends the first nonce to the user device when the token is received at the license manager from the rights manager;
   generating a decryption key to decrypt the encrypted document by combining the first nonce with the encrypted second nonce; and
   decrypting the encrypted document using the decryption key.

5. The method of claim 4, further comprising
   determining by the license manager whether the token received from the rights manager is valid as defined by a standard.

6. The method of claim 4, wherein the license manager also receives a pre-license from the rights manager,
   wherein the pre-license is generated by encrypting the first nonce with a public key of the license manager.

7. The method of claim 6, further comprising
   receiving a license from the license manager when the pre-license and the token are determined to refer to a same document,
   wherein the license is generated at the license manager by decrypting the pre-license using a private key of the license manager and re-encrypting the decrypted pre-license using the public key of the user device.

8. The method of claim 7, wherein generating the decryption key by combining the first nonce with the encrypted second nonce comprises:
   decrypting the license with a private key of the user device;
   decrypting the encrypted second nonce with the private key of the user device; and
   performing an exclusive OR function of the decrypted license with the decrypted second nonce.

9. A system for encrypting a document, the system comprising:
   a first random number generator to generate and deliver a first nonce to a license manager;
   a second random generator to generate and deliver a second nonce to a rights manager;
   a key generator to receive and combine the first and second nonces into a secret key that is deterministically defined by the first and second nonces; and
   an encryptor to receive and encrypt the document using the secret key to produce an encrypted document, and to generate a document identifier,
   wherein the document identifier is delivered to and stored in the rights manager.

10. The system of claim 9, wherein the key generator combines the first and second nonces by performing an exclusive-OR (XOR) function on the first and second nonces.

11. The system of claim 9, wherein the encryptor generates a pre-license by encrypting the first nonce for the license manager with a public key of the license manager.

12. The system of claim 11, wherein the encryptor sends the pre-license and the document identifier to the rights manager.

13. A system for decrypting an encrypted document, the system comprising:
    a user device including a decryptor and a key generator, the user device to receive the encrypted document and a document identifier, and to send a request to a rights manager to access the encrypted document,
    wherein the rights manager sends to a license manager an authorization to generate a license for the encrypted document;
    the key generator to receive an encrypted second nonce from the rights manager, when the rights manager determines to grant the user device access to the encrypted document, wherein the encrypted second nonce is calculated by encrypting a second nonce with a public key of the user device,
    the key generator to receive a first nonce from the license manager, when the rights manager determines to grant the user device access to the encrypted document,
    the key generator to generate a decryption key by combining the first and second nonces, and
    the decryptor to decrypt the encrypted document using the decryption key to produce a decrypted document.

14. The system of claim 13, wherein the request sent to the rights manager includes a certificate of the user device to the rights manager.

15. The system of claim 14, wherein the user device receives a token from the rights manager signed with a private key of the rights manager,
    wherein the token includes certificate of the user device and the document identifier.

16. The system of claim 15, wherein the rights manager generates a pre-license by encrypting the first nonce with a public key of the license manager,
    wherein the user device receives the token, the pre-license, and the encrypted second nonce from the rights manager.

17. The system of claim 16, wherein the license manager also receives the pre-license from the rights manager.

18. The system of claim 16, wherein the user device receives a license from the license manager when the pre-license and the token are determined to refer to a same document,
    wherein the license is generated at the license manager by decrypting the pre-license using a private key of the license manager and re-encrypting the decrypted pre-license using the public key of the user device.

19. The system of claim 13, wherein the key generator generates the decryption key as a combination of: (a) decrypting the license with a private key of the user device; and (b) decrypting the encrypted second nonce with the private key of the user device.

20. The system of claim 19, wherein the combination includes an exclusive OR function of the decrypted license with the decrypted second nonce.

* * * * *